(12) United States Patent
Tom et al.

(10) Patent No.: US 9,106,095 B2
(45) Date of Patent: Aug. 11, 2015

(54) INDUCTIVE CHARGING KEYBOARD

(75) Inventors: Kevin Tom, San Francisco, CA (US);
Kenneth Ryan Loo, San Jose, CA (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/597,515

(22) Filed: Aug. 29, 2012

(65) Prior Publication Data
US 2015/0194837 A1 Jul. 9, 2015

(51) Int. Cl.
*H02J 7/00* (2006.01)
*H02J 7/02* (2006.01)
*H01F 38/14* (2006.01)

(52) U.S. Cl.
CPC .............. *H02J 7/025* (2013.01); *H01F 38/14* (2013.01)

(58) Field of Classification Search
CPC ................................ H02J 7/025; H01F 38/14
USPC ................................................. 320/107–108
See application file for complete search history.

(56) References Cited

U.S. PATENT DOCUMENTS

| | | | | |
|---|---|---|---|---|
| 2,086,099 | A * | 7/1937 | Soulet ............................. | 307/11 |
| 5,838,138 | A * | 11/1998 | Henty ............................ | 320/107 |
| 5,952,814 | A * | 9/1999 | Van Lerberghe ............. | 320/108 |
| 6,421,235 | B2 * | 7/2002 | Ditzik ......................... | 361/679.3 |
| 6,943,666 | B2 * | 9/2005 | Mooney et al. .............. | 340/10.5 |
| 7,755,324 | B2 * | 7/2010 | Odell et al. ................... | 320/115 |
| 8,810,071 | B2 * | 8/2014 | Sauerlaender et al. ....... | 307/104 |
| 2002/0079863 | A1 * | 6/2002 | Abe et al. ...................... | 320/108 |
| 2008/0180060 | A1 * | 7/2008 | Odell et al. ................... | 320/115 |
| 2009/0189565 | A1 * | 7/2009 | Cheng et al. .................. | 320/108 |
| 2010/0039064 | A1 * | 2/2010 | Locker et al. ................. | 320/103 |
| 2011/0084845 | A1 * | 4/2011 | Krug et al. ................. | 340/636.1 |
| 2011/0089895 | A1 * | 4/2011 | Karalis et al. ................. | 320/108 |
| 2011/0115429 | A1 * | 5/2011 | Toivola et al. ................ | 320/108 |
| 2011/0127953 | A1 * | 6/2011 | Walley et al. ................. | 320/108 |
| 2011/0175567 | A1 * | 7/2011 | Kidakarn ....................... | 320/108 |
| 2011/0227528 | A1 * | 9/2011 | Karalis et al. ................. | 320/108 |
| 2011/0241607 | A1 | 10/2011 | Wiegers | |
| 2011/0267000 | A1 * | 11/2011 | Horie ............................ | 320/107 |
| 2012/0091949 | A1 * | 4/2012 | Campanella et al. ......... | 320/108 |
| 2012/0230521 | A1 * | 9/2012 | Azancot et al. ............... | 381/150 |
| 2012/0274267 | A1 * | 11/2012 | Ayanam et al. ............... | 320/107 |
| 2013/0088331 | A1 * | 4/2013 | Cho et al. ..................... | 340/10.1 |
| 2013/0271073 | A1 * | 10/2013 | Yang et al. .................... | 320/108 |

FOREIGN PATENT DOCUMENTS

JP           05276680 A   * 10/1993

* cited by examiner

*Primary Examiner* — Stacy Whitmore
(74) *Attorney, Agent, or Firm* — Lerner, David, Littenberg, Krumholz & Mentlik, LLP

(57) ABSTRACT

Aspects of the disclosure relate to a wireless charging device having an inductive charging coil built into a keyboard, such as the interior space of a keycap in the keyboard. The wireless charging device and keyboard may further be built into a housing of a primary device, such as a laptop computer. The wireless charging device may communicate with another secondary device having a compatible coil. For example, the wireless charging device may transmit, via the inductive charging coil, a wireless charging signal to a wirelessly chargeable device placed on top of the keyboard. In another example, the wireless charging device may receive, through the inductive charging coil, a wireless charging signal from a wireless powering device placed on top of the keyboard.

20 Claims, 9 Drawing Sheets

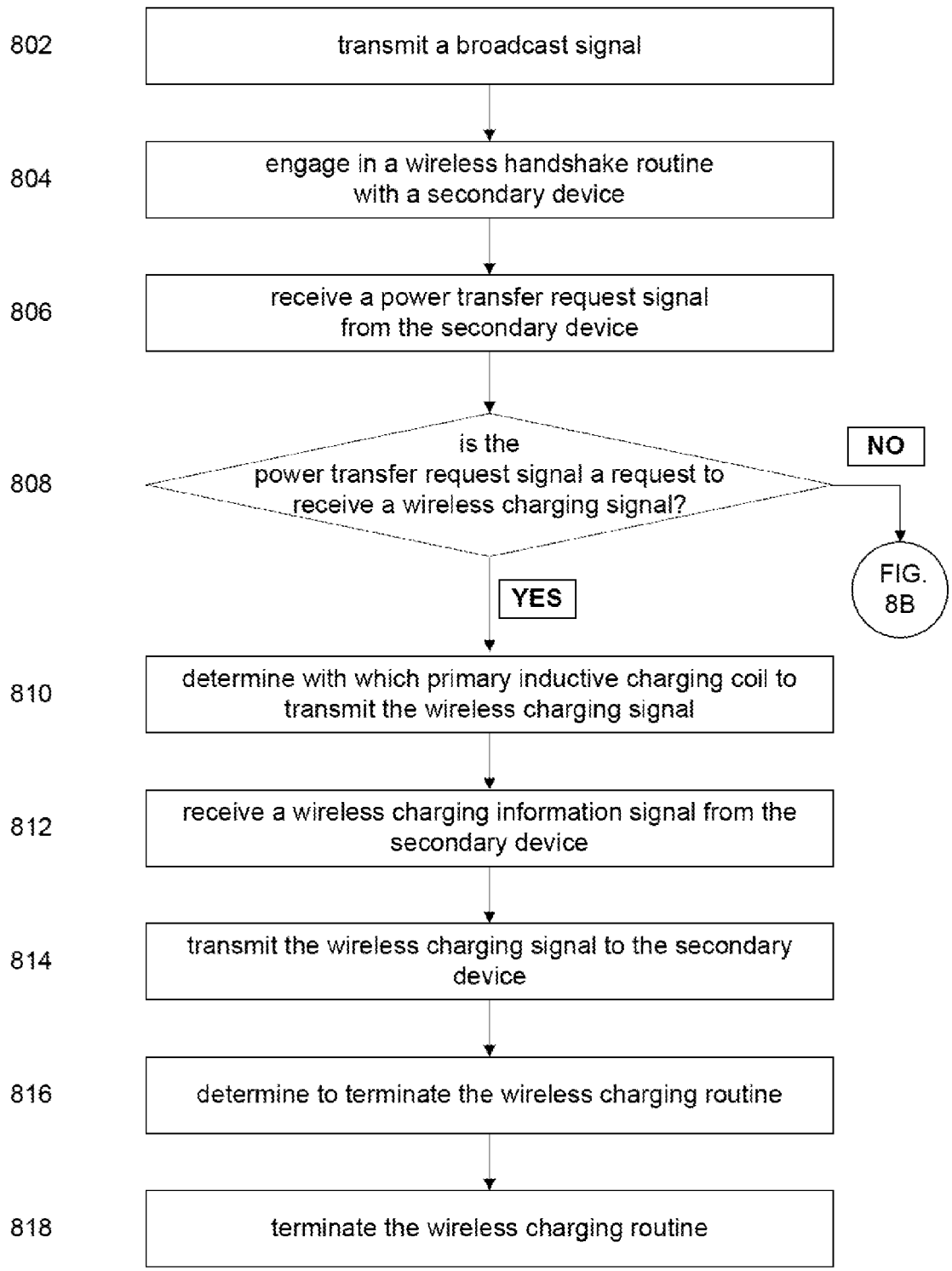
FIGURE 8A    800

INDUCTIVE CHARGING KEYBOARD

BACKGROUND

An inductive charger can efficiently and wirelessly charge a battery in an electronic device by generating a wireless charging signal. The wireless charging signal may be transmitted through non-conductive media, such as through air or plastic. However, electronic devices are commonly made from conductive materials, such as aluminum, steel, and other metals, which interfere with wireless charging signals. This poses a challenge for placing an inductive charger in electronic devices. Furthermore, as many electronic devices are designed progressively thinner, these devices are made using more metal and less plastic, making the challenge of placing an inductive charger within these devices even greater.

SUMMARY

One aspect of the disclosure provides for a device, comprising a keyboard comprising one or more keycaps. The device may also comprise one or more inductive charging coils. Each of the one or more inductive charging coils may be disposed within a corresponding keycap. The device may further comprise a charge control circuit electrically coupled to the one or more inductive charging coils. Accordingly, the charge control circuit may be configured to control one of an electrical current provided to the inductive charging coils and an electrical current provided from the inductive charging coils to a rechargeable battery of the device. In one aspect, the device may be configured to transmit a wireless charging signal to one or more inductive charging coils of a secondary device positioned above the keyboard. The wireless charging signal may recharge a rechargeable battery of the second device. In another aspect, the device may be configured to receive a wireless charging signal from a secondary device positioned above the keyboard. The device may recharge the rechargeable battery using the wireless charging signal.

According to one aspect, the device may further comprise a signal analyzing circuit electrically coupled to the inductive charging coils. The signal analyzing circuit may be configured to analyze a handshake signal and determine, based on the handshake signal, whether a secondary device is positioned above the keyboard.

Another aspect of the disclosure provides a method for executing a wireless charging routine. The wireless charging routine may include at least one of transmitting a wireless charging signal from a first device to a second device and receiving a wireless charging signal at a first device from a second device. The first device may comprise a power source, a keyboard comprising one or more keycaps, and one or more inductive charging coils disposed within corresponding keycaps. The method may comprise receiving, at the first device, a wireless request signal. The method may also comprise determining, at the first device, whether the wireless request signal is a request to wirelessly charge the first device or to receive a wireless charge from the first device. The method may also comprise selecting, at the first device, with which of the one or more inductive charging coils to execute the wireless charging routine. In one aspect, if the wireless request signal is a request to wirelessly charge the first device, the method may further comprise receiving a wireless charging signal at the selected inductive charging coils and relaying a current generated in the selected inductive charging coils to the power source. In another aspect, if the wireless request signal is a request to receive a wireless charge from the first device, the method may further comprise supplying an amount of current from the power source to the selected inductive charging coils and generating a wireless charging signal at the selected inductive charging coils.

A further aspect of the disclosure provides a system, comprising a first device and a second device configured for communicating with the first device. The first device may comprise a keyboard comprising one or more keycaps. The first device may also comprise one or more inductive charging coils. Each of the one or more inductive charging coils may be disposed within a corresponding keycap. The device may further comprise a charge control circuit electrically coupled to the one or more inductive charging coils. Accordingly, the charge control circuit may be configured to control one of an electrical current provided to the inductive charging coils and an electrical current provided from the inductive charging coils to a rechargeable battery of the device. The second device may comprise one or more inductive charging coils. The inductive charging coils of the second device may be configured for transmitting or receiving a wireless charging signal to or from the first device when the second device is positioned above the keyboard.

BRIEF DESCRIPTION OF THE FIGURES

FIGS. 8A and 8B are a flow diagram in accordance with an aspect of the disclosure.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present disclosure is defined by the appended claims and equivalents.

Figure 1:
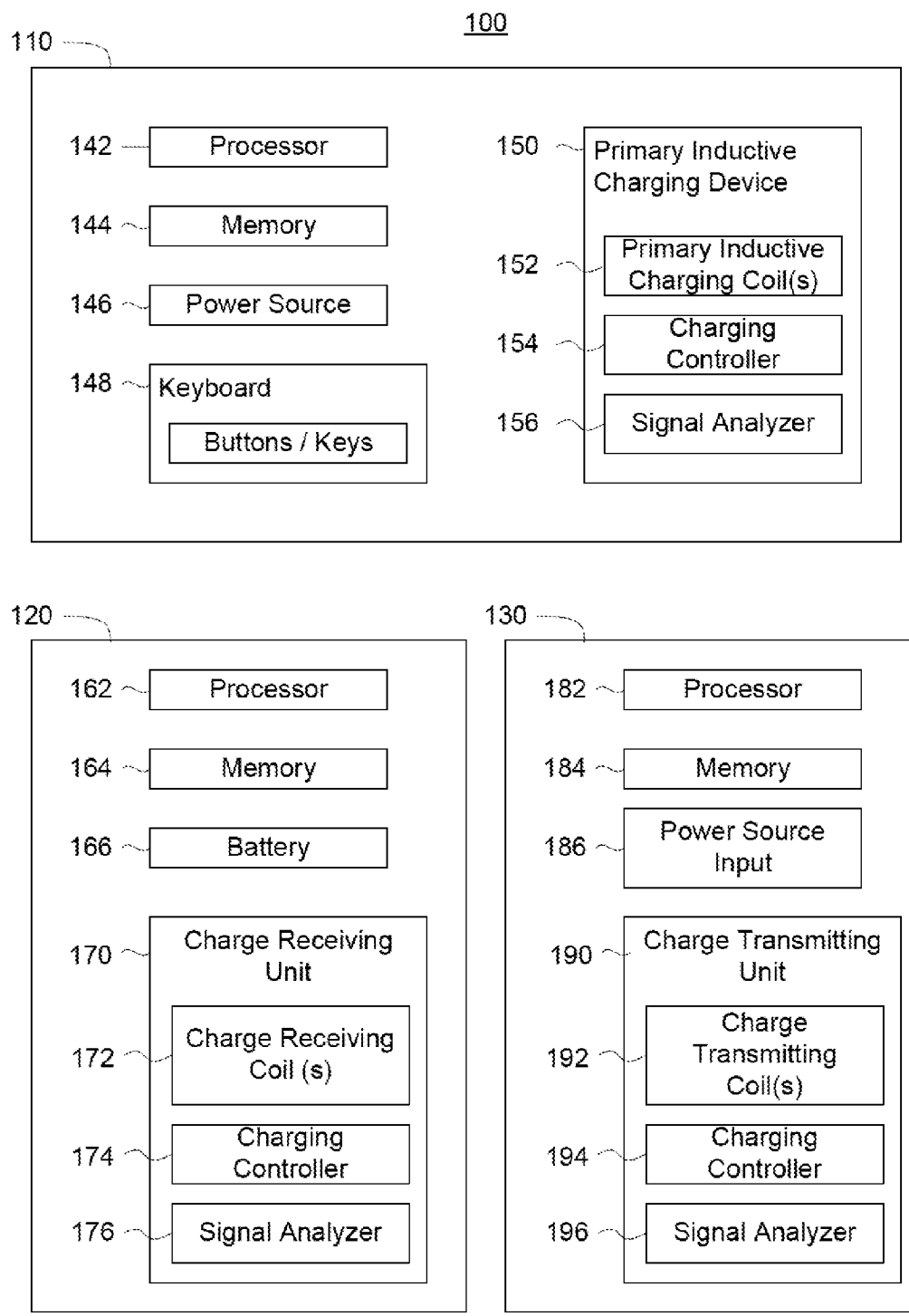
FIG. 1 is a functional block diagram of a system in accordance with aspects of the disclosure.

FIG. 1 is a functional block diagram of a system 100 in accordance with aspects of the disclosure. The system 100 may include a primary device 110. In one example, the primary device 110 may be a laptop computer. In other examples of the disclosure, the primary device may be any device that includes buttons or a keyboard, such as a personal digital assistant, tablet PC, netbook, desktop computer, etc. The system may also include one or more secondary devices, such as a wirelessly chargeable device 120 and a wireless powering device 130. For example, the wirelessly chargeable device 120 may be a portable communications device, a portable navigation device, a portable media player, or any other type of portable device that includes rechargeable batteries. In one example, the wireless powering device 130 may be a wireless charging tray capable of wirelessly powering a battery of the primary device 110.

The primary device 110 may include a processor 142, memory 144, a power source 146, a keyboard 148, and an inductive charging unit 150 for transmitting and/or receiving wireless signals, including wireless charging signals. The primary device 110 may further include user interfaces other than the keyboard 148, such as a mouse, a display monitor, one or more input/output (I/O) ports, and/or other components typically present in general purpose computers.

The processor 142 may be any conventional processor, such as commercially available CPUs. Alternatively, the processor may be a dedicated device such as an ASIC or other hardware-based processor. The memory 144 may store information accessible by processor, including instructions that may be executed by the processor.

The power source 146 may provide electrical power to the primary device 110 and its various electrical components, such as to the inductive charging unit 150. In some examples, the power source 146 may include any conventional power sources conventionally installed in computers, such as one or more rechargeable battery cells. In such examples, the power source 146 may be included within a housing of the primary device 110. In other examples, the power source 146 may include external power sources, such as an electrical outlet. In these examples, the primary device may further include a power cable (not shown) for electrically connecting the primary device 110 to the external power source.

The keyboard 148 may include one or more buttons or keys associated with the primary device 110. The keys may include on/off switches, volume or brightness toggle buttons, navigation buttons, keys of QWERTY or other style keyboards, keys of numeric keypads, etc. As described in greater detail below in FIG. 2, each key may include a keycap, an input device for inputting data by way of a keystroke, such as a rubber dome, and a scissor-switch mechanism or other guide to keep each keycap in its proper alignment. In one example, the keyboard 148 may be enclosed within the housing of the primary device 110 (e.g., built in to the computer). As is typical of laptop computer keyboards, the keyboard 148 may be exposed on an upper surface of the housing such that the keycaps can be pressed by a user of the keyboard 148.

The inductive charging unit 150 may include one or more primary inductive charging coils 152, a charging controller 154, and a signal analyzer 156. The primary inductive charging coils 152 may include one or more inductors, for example, electrically conductive wires, such as copper wires or ferrous wires, wound in a helical formation. In one example, the primary inductive charging coils 152 may receive an electrical current from the power source 146 in order to generate and transmit a wireless charging signal. The charging controller 154 may control the electrical current provided from the power source 146 to the primary inductive charging coils 152, thereby controlling the generated wireless charging signal. For example, the charging controller 154 may include one or more capacitors in series or in parallel to the primary inductive charging coil 152, forming an LC circuit. In some examples where the primary device 110 includes more than one primary inductive charging coil 152, the charging controller 154 may control the electrical current received by each primary inductive charging coil 152.

In another example, the primary inductive charging coils 152 may receive a wireless charging signal from a secondary device, such as a wireless powering device 130, thereby producing an electrical current in the primary inductive charging coils 152 by way of electromagnetic induction. The charging controller 154 may control the produced electrical current in order to charge the power source 146. For example, the charging controller 154 may control the amount and/or frequency of the produced electrical current, thereby enabling the recharging of the power source 146 through the received wireless charging signal.

The signal analyzer 156 may include circuitry for analyzing an electrical signal received from a secondary device, and for determining whether the secondary device is communicating with the primary device 110. The signal analyzer 156 may also include circuitry for detecting the precise location of a secondary device (e.g., on top of the spacebar key of the primary device 110). The signal analyzer 156 may further include circuitry for detecting an intended direction of a wireless power exchange requested by the secondary device (e.g., the secondary device requesting to receive power from the primary device 110, the secondary device requesting to transmit power to the primary device 110, etc.).

Each of the secondary devices may be configured similarly to the primary device 110, with a processor 162/182 and memory 164/184, as described above. The wirelessly chargeable device 120 may also include a battery 166, such as one or more rechargeable battery cells typically used in portable devices. Further, the wirelessly chargeable device 120 may include its own charge receiving unit 170 for wirelessly receiving an electric charge in order to recharge the battery 166. Like the primary inductive charging unit 150, the charge receiving unit 170 may include one or more charge receiving coils 172 configured to communicate with the primary inductive charging unit 150 of the primary device 110. In some examples, the charge receiving unit 170 may similarly include a charge controller 174 and a signal analyzer 176, as described above.

The charge receiving coils 172 may be enclosed within a housing of the wirelessly chargeable device 120. In one aspect of the disclosure, the charge receiving coils 172 may be aligned such that when the wirelessly chargeable device 120 is placed on top of the primary device 110 each of the charge receiving coils 172 is aligned with a primary inductive charging coil 152 of the primary device 110. In one example, one or more charge receiving coils 172 may be fixed in place, for example, affixed to an interior surface of the housing. In another example, one or more charge receiving coils 172 may be free to slide across an open space within the wirelessly chargeable device 120. In such an example, the freely sliding charge receiving coils 172 may align with the primary inductive charging coils 152 by use of an electromagnet or other component capable of attracting a metal coil.

The wirelessly chargeable device 120 may further include all the components normally associated with a personal electronic device, such as a central processing unit (CPU), memory (e.g., RAM and internal hard drives) storing data and instructions, an electronic display, end user input, a camera, speakers, location determining components, a network interfacing device, and all the components used for connecting these elements to one another.

The wireless powering device 130 may include its own power source, or a power source input 186, such as an input port for plugging the wireless powering device 130 to an external power source (e.g., an electrical socket). The power source input 186 may be positioned on a sidewall of a housing of the wireless powering device 130. Further, the wireless powering device 130 may include its own charge transmitting unit 190 for wirelessly transmitting an electrical charge. Like the primary inductive charging unit 150, the charge transmitting unit 190 may include one or more charge transmitting coils 192 configured to communicate with the primary inductive charging unit 150 of the primary device 110. The charge transmitting coils 192 may be enclosed within the housing of the wireless powering device 130 in a similar fashion to the charge receiving coils 172 of the wirelessly chargeable device 120. In some examples, the charge transmitting unit 190 may similarly include a charge controller 194 and a signal analyzer 196, as described above.

In order to facilitate transmission and reception of wireless charging signals between the primary device 110 and a secondary device, the primary inductive charging coils 152 may be contained within one or more plastic keycaps of the keyboard 148. Because of the non-conductive properties exhibited by the plastic keycaps, wireless signals may pass through the keycaps, enabling, for example, a wireless charging signal to travel between a coil positioned under the keycap and the coil of a device placed near the keycap.

Figure 2A:
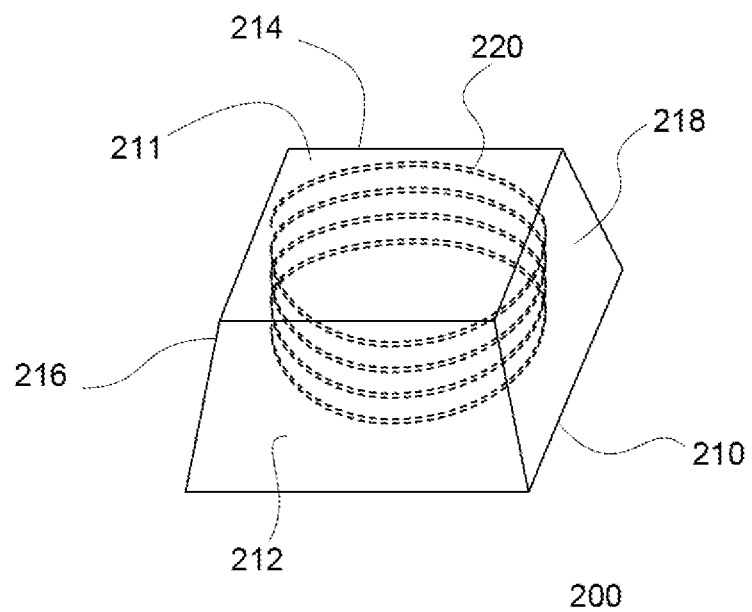
FIGS. 2A and 2B are perspective views of a key in accordance with an aspect of the disclosure.
Figure 2B:
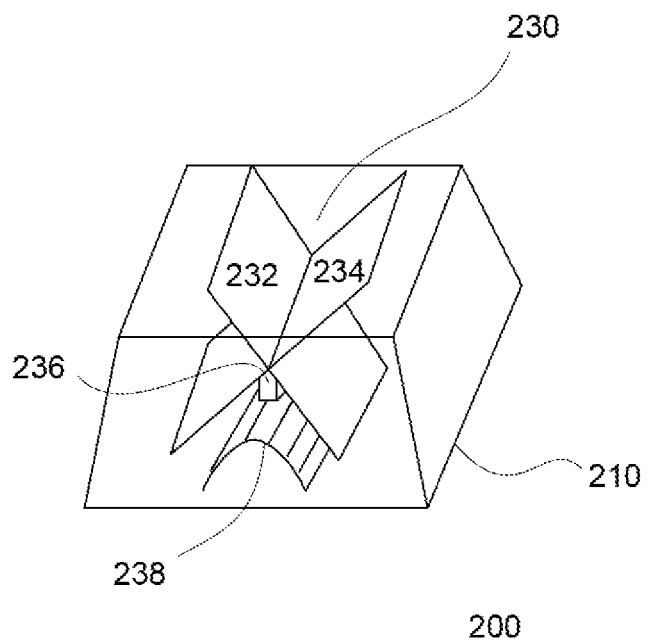

FIGS. 2A and 2B is a perspective view of a key 200 according to one aspect of the disclosure. The key may be included in the keyboard 148 of the primary device 110. For purposes of illustrative clarity, different components of the key 200 are shown in each of FIGS. 2A and 2B, although all of these components may be contained within a single key 200.

As shown in FIG. 2A, the key 200 may include a rigid plastic housing, such as a keycap 210. The keycap 210 may include a top wall 211, front sidewall 212, back sidewall 214, left sidewall 216 and right sidewall 218. In one example, each of the sidewalls 212-218 may be aligned substantially vertically, relative to the top wall 211, such that the space enclosed by the keycap 210 is substantially cubical. In another example, each of the sidewalls 212-218 may be slightly inclined such that space enclosed by the keycap 210 is a truncated square pyramid.

A primary inductive charging coil 220 may be enclosed within the interior space of the keycap 210. In some examples, the primary inductive charging coil 220 may touch each of the sidewalls 212-218 so as to maximize its cross-sectional area. Maximizing cross-sectional area may be beneficial for increasing the overall strength of wireless signals that the primary inductive charging coil 220 transmits. Also, in some examples, the primary inductive charging coil 220 may occupy the interior space of the keycap 210 closest to the top wall 211, and may further be affixed to the top wall 211. Because the strength of a wireless signal transmitted by the inductive charging coil 220 attenuates at an exponential rate as the signal travels, positioning the coil close to the top wall 211 of the keycap 210 ensures that the strongest possible wireless signal may be transmitted to the airspace immediately above the key 200.

The primary inductive charging coil 220 may be wound several times around the interior space of the keycap. Winding the primary inductive charging coil 220 may also be beneficial in increasing the overall strength of wireless signals transmitted by the coil. In the example of FIG. 2, each primary inductive charging coil is wound a total of four rotations. In other examples, a coil may include a greater (e.g., 10, 20) or fewer (e.g., 1, 2) number of winds.

In some examples, each wind of the primary inductive charging coil 220 may touch the sidewalls 212-218 so as to maximize its cross-sectional area. For example, if the space enclosed by the keycap 210 is a truncated square pyramid, the primary inductive charging coil 220 may too be shaped as a truncated square pyramid, each wind having a slightly larger cross-sectional area than the wind immediately above it. In other examples, each wind of the primary inductive charging coil 220 may exhibit a cross-sectional area equal to that of the other winds, regardless of the shape of the keycap 210.

As shown in FIG. 2B, the key 200 may include other components associated with the standard typing functions of a key on a keyboard. For example, the key 200 may include a guiding mechanism, such as a scissor-switch 230, to guide the keycap 210 down and back up when pressed and released respectively. The scissor-switch 230 may include two plastic bars 232 and 234 configured in the shape of an "X" attached to the underside of the top wall 211 of the keycap 210, and a plunger 236. The interior space of the keycap may also include an actuating mechanism to register a keystroke, such as a rubber dome 238 which registers a keystroke when depressed by the plunger 236. The scissor-switch 230 (including the plastic bars 232/234 and plunger 236) and the rubber dome 238 may occupy the space in the center of the key 200, leaving room for the primary inductive charging coil 220 along the sidewalls 212-218 at the perimeter of the key 200. In one example, the primary inductive charging coil may be wrapped around the scissor switch. In another example, the primary inductive charging coil 220 may be affixed to the interior sidewalls 212-218 of the keycap 210 without touching the scissor-switch 230. Both of the above described examples may permit the primary inductive charging coil 220 to be held in place within the keycap 210.

Figure 3:
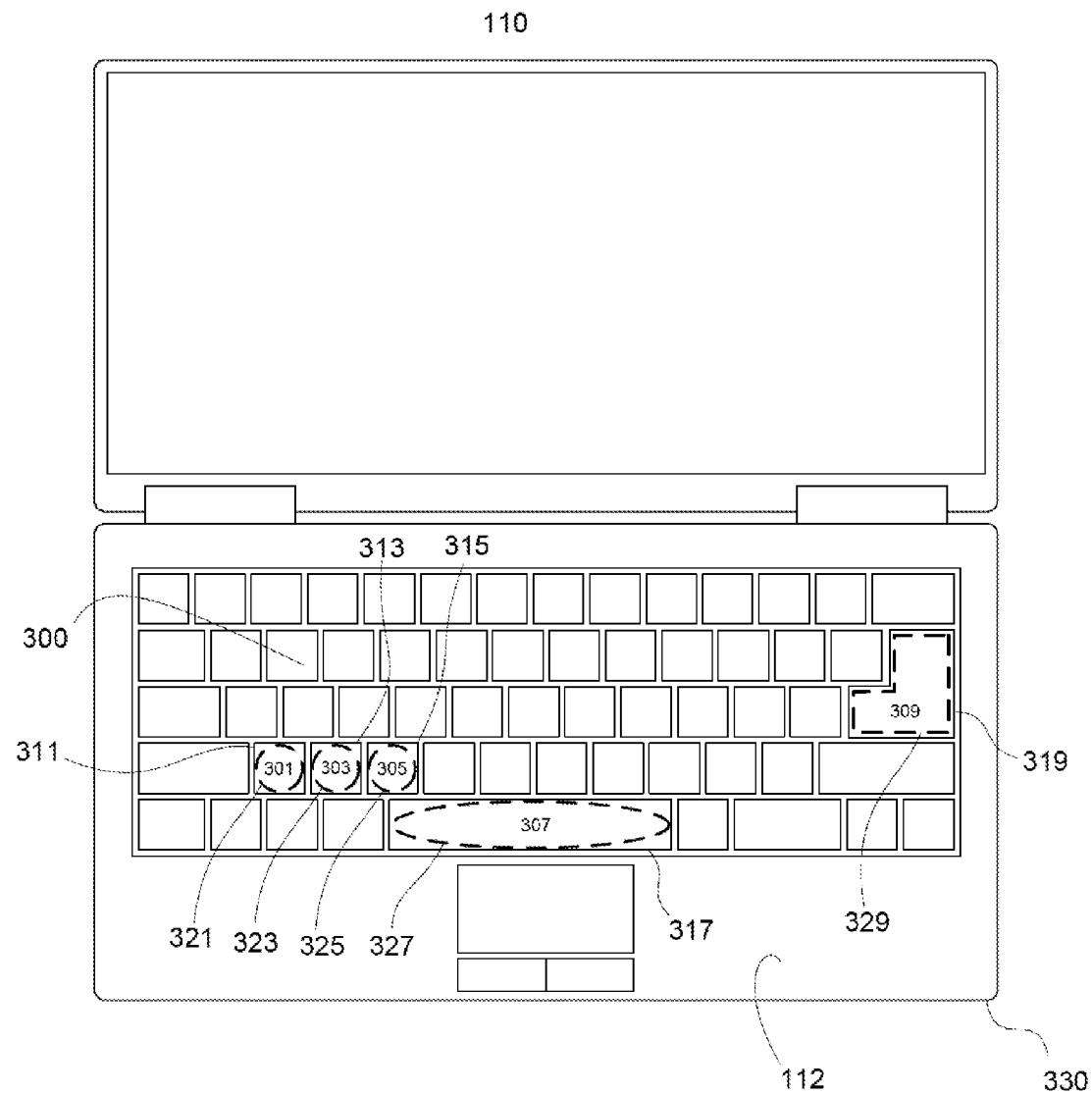
FIG. 3 is a top view of a primary device in accordance with an aspect of the disclosure.

FIG. 3 depicts an arrangement of keys containing primary inductive charging coils within a laptop computer 110 according to one aspect of the disclosure. In the example of FIG. 3, the laptop computer 110 includes a QWERTY keyboard 300 having several keys, including letter keys 301, 303, and 305, a spacebar key 307, and a return key 309. Each key 301-309 may include a respective keycap 311-319, as described above in relation to FIGS. 2A and 2B. Primary inductive charging coils 321-329 may be placed underneath the keycaps 311-319 the keys 301-309, respectively, also as described above.

In one aspect of the disclosure, each primary inductive charging coil 321-329 may be wound to resemble the shape of its respective keycap 311-319. For example, letter key coils 321, 323, and 325 may each be wound in either a square or circular shape, resembling the shape (from an overhead perspective) of each coil's respective keycap 311, 313, and 315. In another example, the spacebar key coil 327 may be wound in either an oval or rectangular shape, resembling the shape of the spacebar keycap 317. In yet another example, the return key coil 329 may be wound in an ell-shaped pattern, resembling the shape of the return keycap 319. In other examples of the disclosure, each coil may be wound in any pattern such that the coil may fit inside its respective keycap.

Due to the varying sizes of the keycaps 311-319 featured on the keyboard 300, the cross-sectional area of the coils 321-329 may vary from keycap to keycap. For example, the spacebar key coil 323 may have a large cross-sectional area (relative to coils enclosed within other keys of the keyboard 300). Meanwhile, the letter key coils 321-325 may have a relatively small cross-sectional area. It may be beneficial to include coils of varying cross-sectional areas within the keyboard 300, as each coil may exhibit different power transmission characteristics. For example, it may be beneficial to transmit a wireless signal using a coil having a particular cross-sectional area and to receive a wireless signal using a coil having a different cross-sectional area. In another example, it may be beneficial to communicate with a specific secondary device using a coil having a particular cross-sectional area and to communicate with a different secondary device using a coil having a different cross-sectional area.

Including inductive charging coils of varying size in the keyboard 300 may also provide additional benefits. For example, the larger coils (e.g., the spacebar key coil 327)

included in the keyboard 300 may provide for more efficient transfer of wireless energy to a wirelessly chargeable device 120, while smaller coils (e.g., letter key coils 321-325) included in the keyboard 300 may provide for more efficient reception of a wireless charging signal transmitted from a wireless powering device 130 placed on top of the keyboard 300.

For illustrative purposes, only a few keys in FIG. 3 are shown to include inductive charging coils. However, in other aspects of the disclosure, any key may include an inductive charging coil. In one example, every key of the keyboard 300 may include an inductive charging coil. Further, in some examples, a key may include more than one inductive charging coil. For example, the spacebar key 307 may include several coils, each having smaller cross-sectional areas than that of the spacebar key coil 327 (e.g., several coils similar in area to the letter keys coils 321-325).

Figure 4:
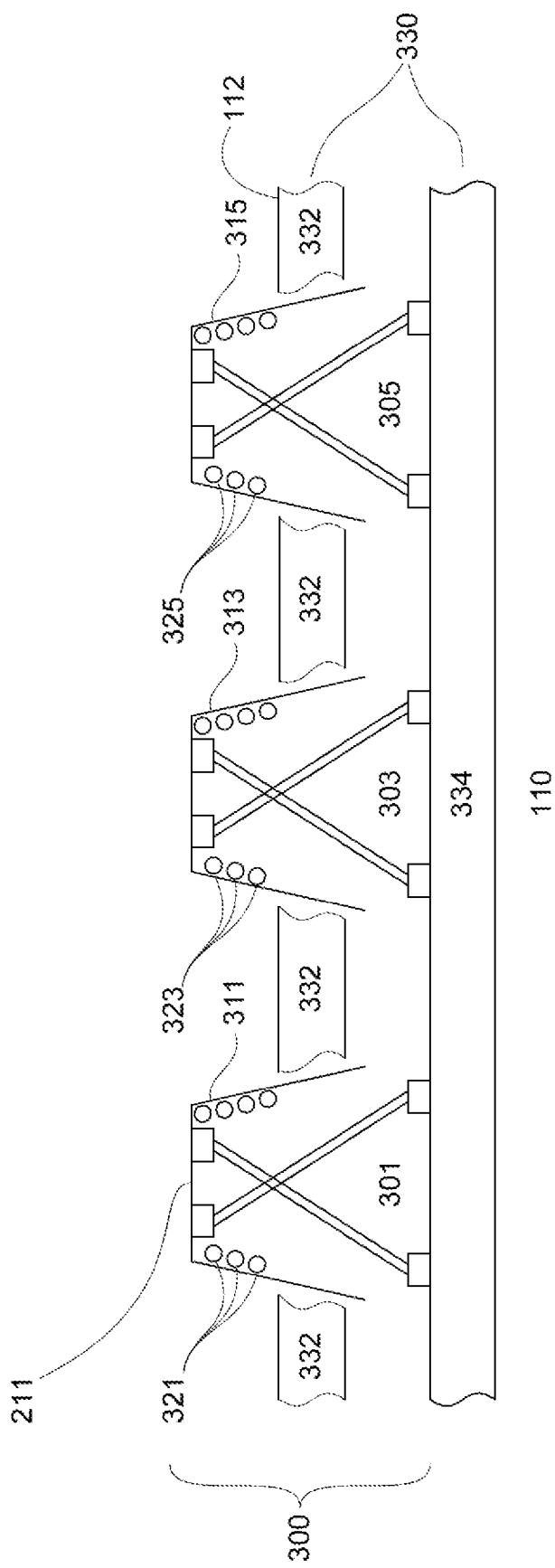
FIG. 4 is a cross-sectional view of the primary device of FIG. 3 in accordance with an aspect of the disclosure.

FIG. 4 depicts a cross-sectional view of three letter keys included in the keyboard 300, for example, letter keys 301, 303, and 305. The aspects of this disclosure described in connection with FIG. 4 may equally apply to any other keys or buttons included in the keyboard 300.

The letter keys 301-305 may be positioned along the upper surface 112 of the laptop computer 110, such that a top wall 211 of each of the keycaps 311-315 may protrude beyond the upper surface 112 of the laptop computer 110. In another example, the top wall 211 of each keycap 311-315 may rest coplanar with the upper surface 112 of the computer. In some examples, the top wall 211 of each of the keycaps 311-315 may rest at an equal height with one another. In another example, the top walls 211 of each of the keycaps 311-315 may rest at a different height (e.g., keycap 311 protrudes farther above the upper surface 112 when at rest than does keycap 313).

To prevent the keycaps 311-315 from falling out of the keyboard 300, each of the keycaps 311-315 may be at least partially encased within an upper portion 332 of the housing 330, such as a rigid plastic mold casing. The upper portion 332 may help to keep each of the keys 301-305 separate from one another and in proper alignment. The keycaps 311-315 may also be at least partially encased within a lower housing 334, such as a metal or rigid plastic mold casing. The lower housing 334 may provide a barrier between the keyboard 300 and the other above-described components of the laptop computer 110 (e.g., the power source 146, the processor 142, etc.). The lower housing 334 may also provide support for the scissor switch mechanism 230.

Figure 5:
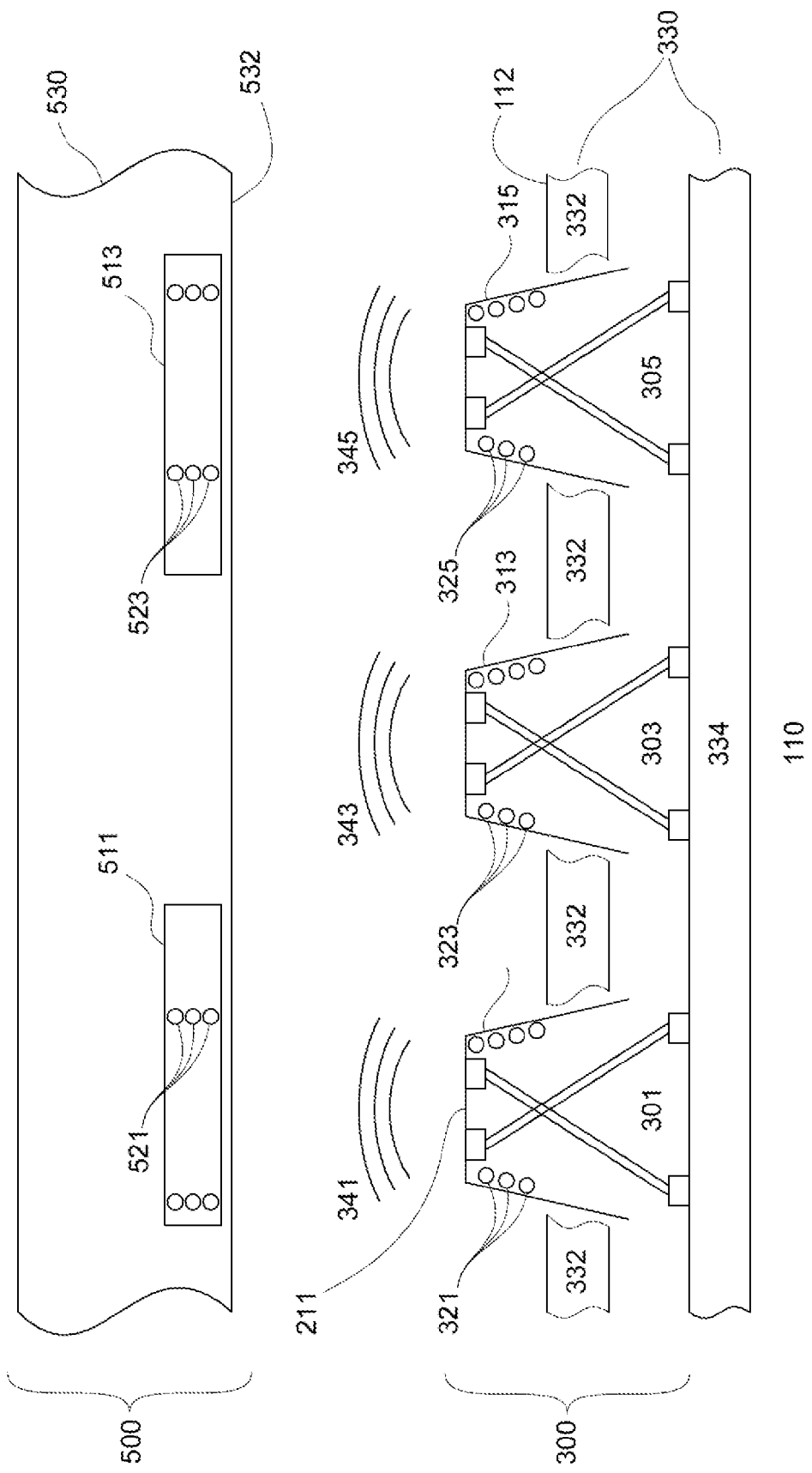
FIG. 5 is a cross-sectional view of the primary device of FIG. 3 in connection with a secondary device in accordance with an aspect of the disclosure.

In one aspect of the disclosure, each primary inductive charging coil 321-325 may generate a wireless charging signal (e.g., an induced magnetic field) in the airspace above the corresponding coil. For example, in FIG. 5, each of the primary inductive charging coils 321-325 may transmit one or more wireless charging signals 341-345 to a PDA 500. In the example of FIG. 5, the PDA 500 may be placed in the airspace above the keyboard 300. The PDA 500 may include one or more inductive charging coils, such as charge receiving coils 521 and 523, contained within a housing 530. The charge receiving coils 521 and 523 may be positioned along the bottom wall 332 of the PDA 500, such that the charge receiving coils 521 and 523 are in close proximity to the primary inductive charging coils 321-325 when the PDA 500 is placed on top of the keyboard 300. In one example, each charge receiving coil 521 and 523 may be affixed to the interior side of the bottom wall 532 of the housing 530. In another example, each charge receiving coil 521 and 523 may slide freely across an open space, such as cavities 511 and 513 respectively, within the PDA 500. In such an example, each freely sliding charge receiving coil may align with a corresponding primary inductive charging coil by use of, for example, an electromagnet. In the example of FIG. 5, charge receiving coil 521 may align with primary inductive charging coil 321 in order to efficiently receive wireless charging signal 341, and charge receiving coil 523 may align with primary inductive charging coil 323 in order to efficiently receive wireless charging signal 343.

In other examples, the primary device 110 may transmit a wireless charging signal to devices other than the PDA 500, such as a portable communications device, a portable navigation device, a portable media player, or any other type of wirelessly chargeable portable device.

Figure 6:
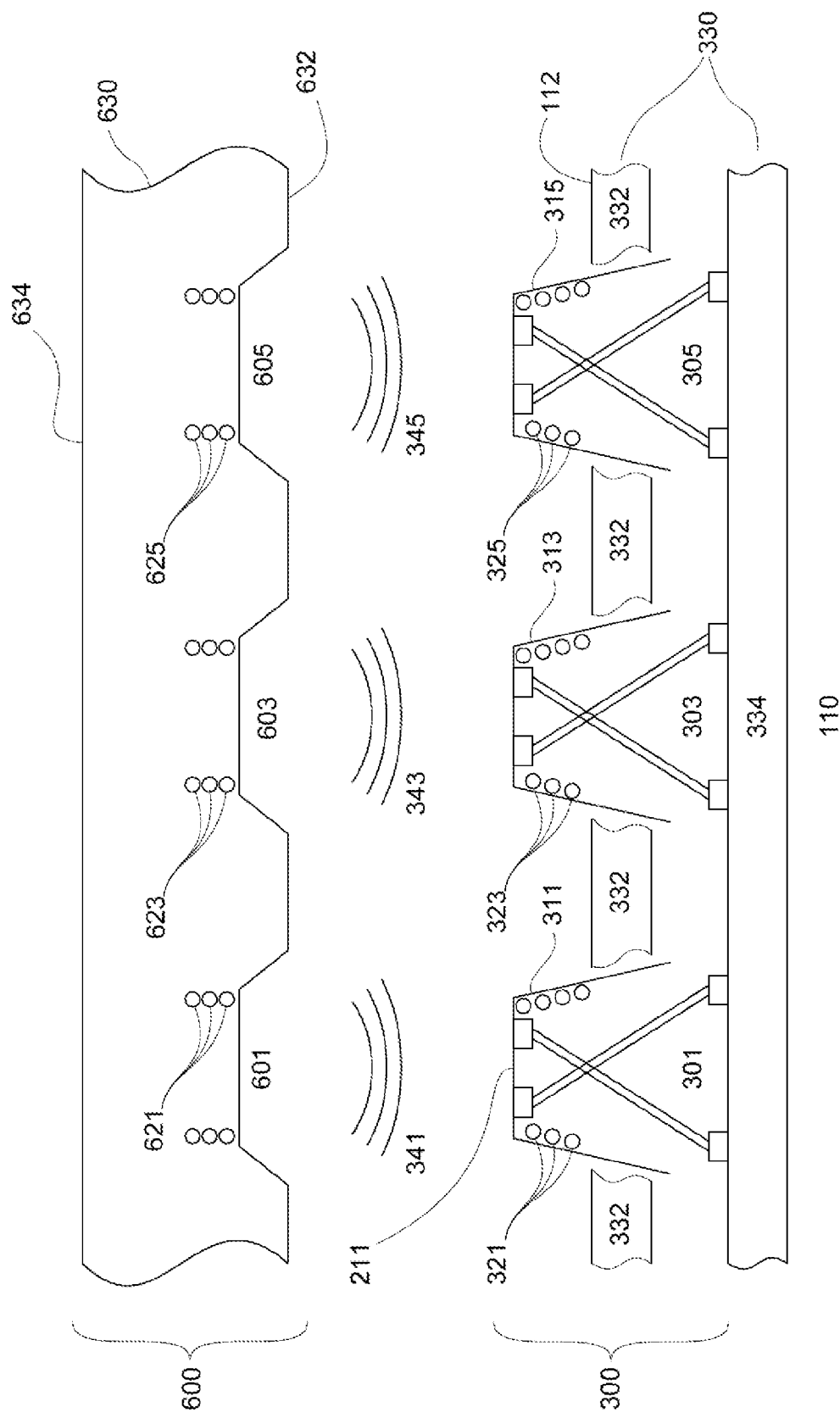
FIG. 6 is a cross-sectional view of the primary device of FIG. 3 in connection with another secondary device in accordance with an aspect of the disclosure.

In another aspect of the disclosure, each primary inductive charging coil 321-325 may receive a wireless charging signal transmitted from another device in the airspace above the keyboard 300. For example, in FIG. 6, the primary inductive charging coils 321-325 may receive one or more wireless charging signals 641-645 from a wireless charging tray 600. In the example of FIG. 6, the wireless charging tray 600 may be placed in the airspace above the keyboard 300. In one example, the wireless charging tray 600 may include grooves 601-605 on a bottom wall 632 of a housing 630, extending from the bottom wall 632 to a top wall 634 of the housing 630. Each space carved out of the housing 630 by the grooves 601-605 may match the shape of the keycaps 311-315. Additionally, the grooves 601-605 may be positioned along the bottom wall 632 of the housing 630. Each groove 601-605 may be arranged in alignment with a corresponding key 301-305 of the keyboard 300.

The wireless charging tray 600 may include one or more charge transmitting coils, such as coils 621, 623, and 625. Each coil may be contained within the housing 630. Similar to the charge receiving coils 321 and 323 of the PDA 500 in FIG. 5, the charge transmitting coils 621-625 may also be positioned along the bottom wall 632 of the wireless charging tray, such that the charge transmitting coils 621-625 may be in close proximity to the primary inductive charging coils 321-325 when the wireless charging tray 600 is placed on top of the keyboard 300. In the example of FIG. 6, where the wireless charging tray includes grooves 601-605, the charge transmitting coils 621-625 may be positioned in line with the grooves 601-605. This may be especially beneficial in facilitating proper alignment between the charge transmitting coils 621-625 and the corresponding primary inductive charging coils 321-325.

In one example, the wireless charging tray 600 may be placed on top of all the keys present on the keyboard 300. In another example, the wireless charging tray 600 may fit over a subset of keys on the keyboard 300, such as the numeric pad or the function keys of the keyboard. Covering only a portion of the keys may enable a user of the primary device 110 to operate some keys of the keyboard 300 while charging the primary device 110 via the other keys.

In one example, the wireless charging tray 600 may be designed to be compatible with a variety of keyboards, for example, of different sizes, having different spacing between keys, having differently shaped keycaps, etc. In other examples, the grooves 601-605 of the wireless charging tray 600 may be specifically designed to fit over the keycaps of a particular keyboard, such as a standard full size keyboard (19 mm pitch) or other size keyboard.

In other examples of the disclosure, any other wireless powering device 130 may be used to power the primary device 110 in place of the wireless charging tray 600, such as a keyboard mask, a charging dock, or any portable device with a built in charging dock.

Figure 7:
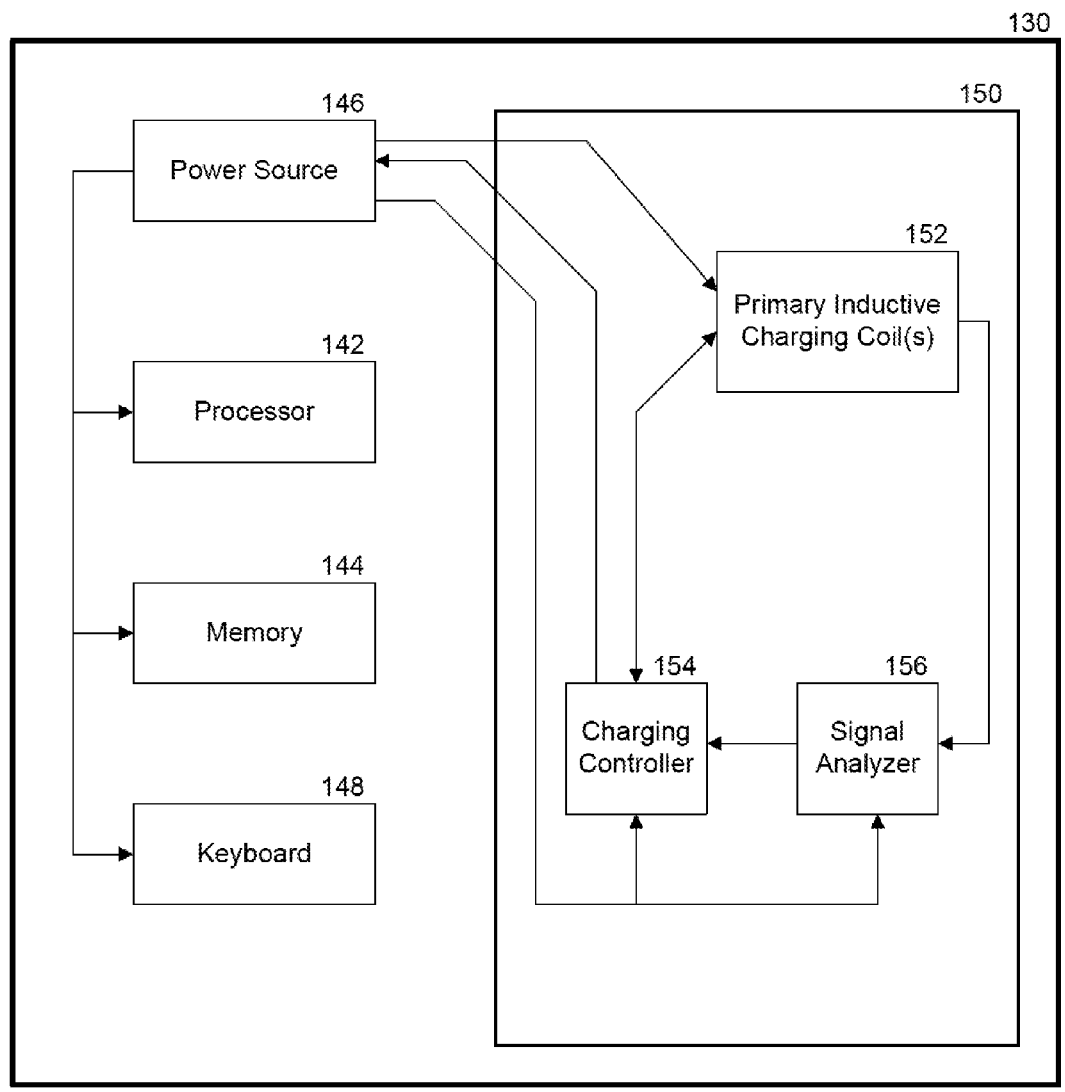
FIG. 7 is a functional diagram of a system in accordance with aspects of the disclosure.

In order to control the transfer of wireless power in the above examples, the primary inductive charging coils 321-325 may be electrically connected to the other components of the primary device 110. For example, FIG. 7 is a functional diagram illustrating the interconnections among components of the primary device 110. In the example of FIG. 7, the power source 146 may supply power to other components of the primary device 110, such as to the processor 142, the keyboard 148, and the primary inductive charging unit 150.

The charging controller 154 may be coupled to the primary inductive charging coils 152. In one example, the charging controller 154 may provide a modulated power signal, such as an alternating current signal, to the primary inductive charging coils 152 in order to produce a wireless charging signal. In another example, the charging controller 154 may relay a wireless charging signal from the primary inductive charging coils 152 to the power source 136 in order to recharge the power source 136.

The signal analyzer 156 may be coupled to the primary inductive charging coils 152 and the charging controller 154. In some examples, the device signal analyzer 156 may receive a wireless signal, such as an identification signal sent by another device, identify information included in the wireless signal, and relay instructions to the charging controller 154 in accordance with the information contained in the received signal. For example, the signal analyzer 156 may determine that the wireless signal is a request to receive a wireless charging signal, and may instruct the charging controller 154 to provide a modulated power signal to the primary inductive charging coils 152. In another example, the signal analyzer 156 may determine that the wireless signal is a request to transmit a wireless charging signal, and may instruct the charging controller 154 to relay a wireless charging signal received by the primary inductive charging coils 152 to the power source 136. In yet another example, if there is more than one primary inductive charging coil 152, the signal analyzer 156 may determine the distance between each coil and the other device and, based on this determination, may instruct the charging controller 154 as to which primary inductive charging coils 152 to provide a wireless charging signal.

The components of the wirelessly chargeable device 120 and the wireless powering device 130 may be interconnected similarly to those of the primary device 110. In the example of the wirelessly chargeable device 120, the charging controller 174 may relay a wireless charging signal received by the charge receiving coils 172 to the battery 166 in order to recharge the battery 166. In the example of the wireless powering device 130, the charging controller 192 may provide a wireless charging signal to the charge transmitting coils 192 in order to wirelessly charge the primary device 110. Both devices 130 and 135 may include a signal analyzer 176/196. Similar to the signal analyzer 156 of the primary device 110, the signal analyzer 176/196 may receive and analyze wireless signals, such as information signals, broadcasted by the primary device 110.

The example system described above may be operated in accordance with an aspect of the disclosure using the methods described herein. It should be understood that the following operations do not have to be performed in the precise order described below. Rather, various operations can be handled in a different order, or simultaneously. Moreover, operations may be added or omitted.

Figure 8B:
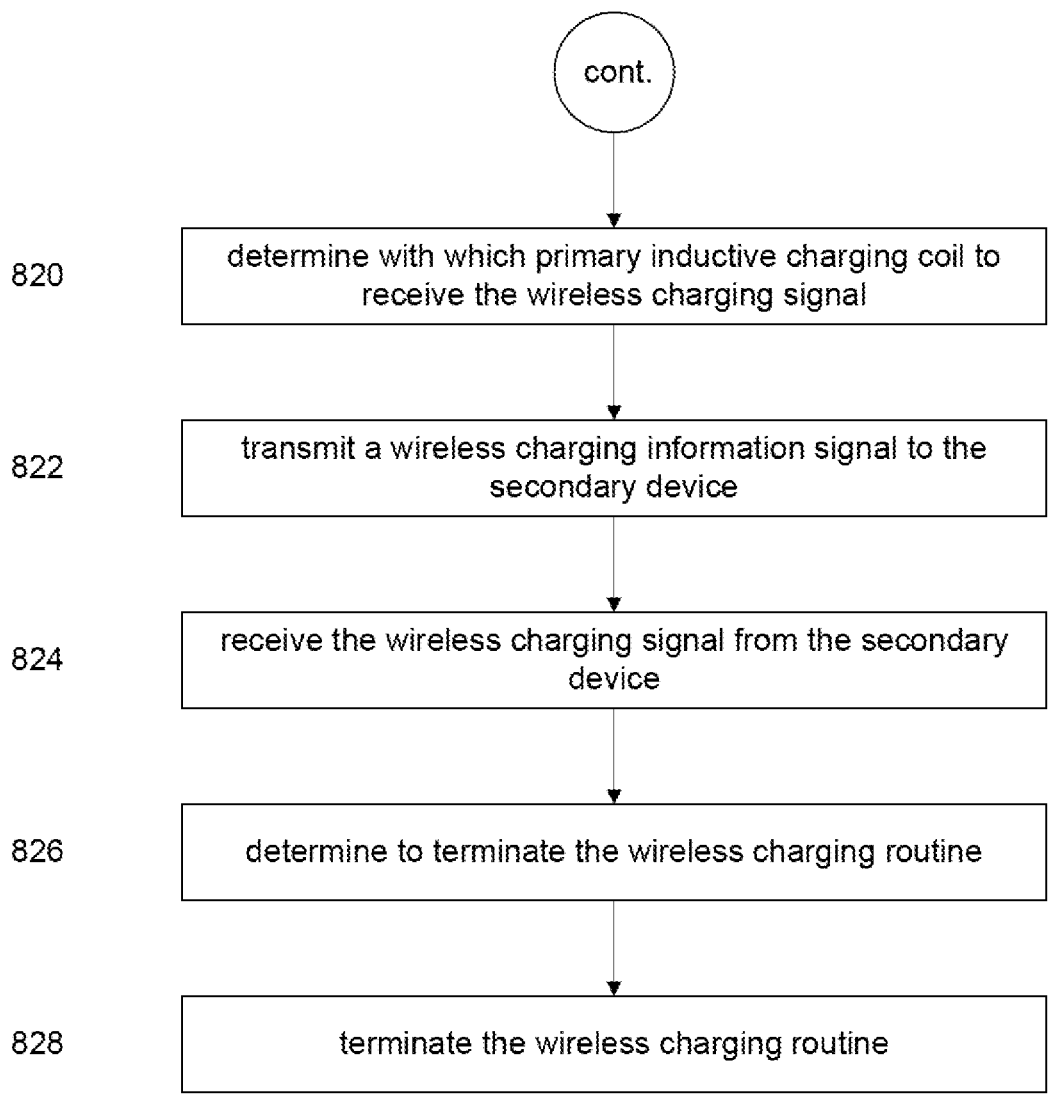

FIGS. 8A and 8B illustrate an example flow chart 800 in accordance with some of the aspects described above. In the example of flow chart 800, the primary device 110 may engage in a wireless charging routine, either receiving or transmitting an electrical charge wirelessly. Beginning with FIG. 8A, in block 802, the primary device 110 may transmit a broadcast signal. For example, the power source 146 may supply an amount of current to one or more primary inductive charging coils 152 in order to induce a magnetic field around the inductive charging coil.

In block 804, the primary device 110 may engage in a wireless handshake routine with a secondary device, such as a wirelessly chargeable device 120 or a wireless powering device 130. For example, a secondary device in close proximity to the primary device 110 may detect the broadcast signal generated by the primary device 110 and generate a handshake signal in response to the broadcast signal. In one example, the handshake signal may indicate the presence of the secondary device in close proximity to the primary device 110. In another example, the handshake signal may indicate that the secondary device has wireless charging capabilities compatible with the primary device 110. In yet a further example, the handshake signal may indicate the strength of the broadcast signal received by the secondary device, suggesting a distance between the primary device 110 and the secondary device. The handshake signal may be detected by the primary device 110, informing the primary device 110, for example, that the secondary device is in close proximity and/or the distance between the devices.

In some examples of the disclosure, the handshake signal may continue to be transmitted for the duration of the wireless charging routine. This may indicate to the primary device 110 that the secondary device is still within proximity.

In some examples, the primary device may initiate the handshake signal in order to execute the handshake routine. For example, instead of the primary device 110 transmitting the broadcast signal and the secondary device responding to the signal, the secondary device may transmit the broadcast signal to which the primary device may respond with a handshake signal.

In block 806, the primary device 110 may receive a power transfer request signal from the secondary device. For example, the primary device may receive a signal indicating whether the secondary device is requesting to receive a wireless charging signal or transmit a wireless charging signal.

In block 808, the primary device may determine whether the power transfer request signal is a request to receive a wireless charging signal. If the power transfer request signal of the secondary device is a request to receive a wireless charging signal, then the primary device 110 may determine that it will transmit a wireless charging signal. In another example, if the power transfer request signal is not a request to receive a wireless charging signal, then the primary device 110 may determine that it will instead receive a wireless charging signal from the secondary device.

If the primary device 110 determines that the power transfer request signal is a request to receive a wireless charging signal, then operations continue in block 810, where the primary device 110 may determine with which of the one or more primary inductive charging coils 152 to transmit the wireless charging signal. In one example, the primary device 110 may determine to transmit the wireless charging signal using the primary inductive charging coils 152 closest to the secondary device (e.g., the primary inductive charging coils in which the most electrical charge is induced in response to a wireless signal transmitted from the secondary device). In another example, the primary device 110 may determine to transmit the wireless charging signal using the largest primary inductive charging coils 152 within a predetermined distance from the coil closest to the secondary device.

In block 812, the primary device 110 may receive a wireless charging information signal from the secondary device. In one example, the wireless charging information signal may indicate a frequency at which the primary device 110 should transmit the wireless charging signal. In another example, the wireless charging information signal may indicate an amplitude at which the wireless charging signal should be transmitted. In some examples, the wireless charging information signal may be analyzed along with the handshake signal (which includes information regarding the distance of the devices and may indicate an expected amount of attenuation to the wireless charging signal during the charging process).

In block 814, the charging controller 154 may transmit the wireless charging signal to the secondary device. For example, the charging controller 154 may provide a modulated power signal to the primary inductive charging coils 152 according to the parameters specified by the handshake signal and/or the information signal. The wireless charging signal may be transmitted until, in block 816, the primary device 110 determines to terminate the wireless charging routine. In one example, the primary device may receive a termination signal from the secondary device requesting to terminate the wireless charging routine. In another example, the primary device 110 may determine to terminate the routine once it is no longer receiving a handshake signal, indicating that the secondary device is no longer in proximity. In block 818, the wireless charging routine may be terminated.

Continuing the flow chart 800 with FIG. 8B, if the primary device 110 determines that the power transfer request signal is not a request to receive a wireless charging signal, then operations continue in block 820, where the primary device 110 may determine with which of the one or more primary inductive charging coils 152 to receive the wireless charging signal from the secondary device. In one example, the primary device 110 may determine to receive the wireless charging signal using the primary inductive charging coils 152 closest to the secondary device. In another example, the primary device 110 may determine to receive the wireless charging signal using the smallest primary inductive charging coil 152 within a predetermined distance from the coil closest to the secondary device.

In block 822, the primary device 110 may transmit a wireless charging information signal to the secondary device. In one example, the wireless charging information signal may indicate a frequency at which the primary device 110 should receive the wireless charging signal. In another example, the wireless charging information signal may indicate an amplitude at which the wireless charging signal should be transmitted. In some examples, the information included in the wireless charging information signal may be based in part on the information received in the handshake signal (which may indicate the distance between the devices and an expected amount of attenuation to the wireless charging signal during the charging process).

In block 824, the primary device 110 may receive the wireless charging signal from the secondary device. Receiving the wireless charging signal may include the charging controller 154 relaying the wireless charging signal from the primary inductive charging coils 152 to the power source 136.

The wireless charging signal may be received until, in block 826, the primary device 110 may determine to terminate the wireless charging routine. In one example, the primary device 110 may determine that the power source is fully charged. In another example, the primary device 110 may determine that it is no longer receiving a wireless charging signal from the secondary device (e.g., the secondary device is no longer in proximity to transmit a wireless charging signal). In block 828, the wireless charging routine may be terminated.

The above-described technology may be advantageous in that it enables the placement of an inductive charger within a device made mostly of metal and other conductive materials. Combining an inductive charger with a primary device, such as a laptop computer, also reduces the number of devices the user must operate in order to perform multiple tasks, such as charging a portable phone while operating the laptop, at the same time, and simultaneously reduces the number of wires and/or cables required to perform the aforementioned tasks.

As these and other variations and combinations of the features discussed above can be utilized without departing from the systems and methods as defined by the claims, the foregoing description of example implementations should be taken by way of illustration rather than by way of limitation of the disclosure as defined by the claims. It will also be understood that the provision of examples (as well as clauses phrased as "such as," "e.g.", "including" and the like) should not be interpreted as limiting the disclosure to the specific examples; rather, the examples are intended to illustrate only some of many possible aspects.

The invention claimed is:

1. A device, comprising:
   a keyboard comprising one or more keycaps;
   one or more inductive charging coils, each of the one or more inductive charging coils being disposed within a corresponding keycap of the one or more keycaps;
   a charge control circuit electrically coupled to the one or more inductive charging coils, the charge control circuit configured to control one of (a) an electrical current provided to the one or more inductive charging coils and (b) an electrical current provided from the one or more inductive charging coils to a rechargeable battery of the device;
   wherein the one or more inductive charging coils disposed within the one or more keycaps are configured to perform:
      transmitting a wireless charging signal to one or more inductive charging coils of a secondary device positioned above the keyboard, the wireless charging signal recharging a rechargeable battery of the secondary device; and
      receiving a wireless charging signal from a secondary device positioned above the keyboard, and recharging the rechargeable battery of the device using the wireless charging signal.

2. The device of claim 1, wherein each of the one or more inductive charging coils physically contacts at least one of a front sidewall, back sidewall, left sidewall, and right sidewall of the corresponding keycap.

3. The device of claim 1, wherein each of the one or more inductive charging coils is wound in a helical pattern corresponding to a shape of an upper wall of the corresponding keycap.

4. The device of claim 1, wherein each of the one or more inductive charging coils physically contacts an upper wall of the corresponding keycap.

5. The device of claim 1, comprising at least two inductive charging coils, wherein:
   if the charge control circuit is configured to control an electrical current provided to the one or more inductive charging coils, the charge control circuit is further configured to select to which of the at least two inductive charging coils to provide the electrical current; and if the charge control circuit is configured to control an electrical current provided from the one or more inductive charging coils to the rechargeable battery of the device, the charge control circuit is further configured to select from which of the at least two inductive charging coils to provide the electrical current to the rechargeable battery.

6. The device of claim 5, wherein the charge control circuit is further configured to select an inductive charging coil based on a distance between the selected inductive charging coil and a coil of the second device.

7. The device of claim 5, wherein the charge control circuit is further configured to select an inductive charging coil based on a cross-sectional area of the selected inductive charging coil and a cross-sectional area of a coil in the second device.

8. The device of claim 7, wherein the charge control circuit is configured to select an inductive charging coil further based on:
   if the wireless request signal is a request to wirelessly charge the first device, the selected inductive charging coil having a first cross-sectional area; and
   if the wireless request signal is a request to be wirelessly charged by the first device, the selected inductive charging coil having a second cross-sectional area, wherein the second cross-sectional area is either larger or smaller than the first cross-sectional area.

9. The device of claim 1, wherein each of the one or more inductive charging coils is configured to receive a handshake signal, the handshake signal indicating that the secondary device is positioned above the keyboard.

10. The device of claim 9, further comprising a signal analyzing circuit electrically coupled to the one or more inductive charging coils, the signal analyzing circuit configured to analyze the handshake signal and to determine, based on the handshake signal, whether the secondary device is positioned above the keyboard.

11. The device of claim 1, wherein the device is one of a laptop computer, a personal digital assistant, a tablet PC, a netbook, and a desktop computer.

12. The device of claim 1, wherein the one or more keycaps are associated with one of the numeric pad portion and the function key portion of the keyboard.

13. A method for executing a wireless charging routine, the wireless charging routine including at least one of (i) transmission of a wireless charging signal from a first device to a second device, and (ii) receipt of a wireless charging signal at a first device from a second device, wherein the first device comprises a power source, a keyboard comprising one or more keycaps, and one or more inductive charging coils disposed within corresponding keycaps of the one or more keycaps, the method comprising:
   receiving, at the first device, a wireless request signal;
   determining, at the first device, whether the wireless request signal is a request to wirelessly charge the first device or a request to receive a wireless charge from the first device;
   selecting, at the first device, with which of the one or more inductive charging coils to execute the wireless charging routine;
   if the wireless request signal is a request to wirelessly charge the first device, receiving a wireless charging signal at the selected one or more inductive charging coils disposed within the one or more keycaps and relaying a current generated in the selected one or more inductive charging coils to the power source; and
   if the wireless request signal is a request to be wirelessly charged by the first device, supplying an amount of current from the power source to the selected one or more inductive charging coils disposed within the one or more keycaps, and generating a wireless charging signal at the selected one or more inductive charging coils.

14. The method of claim 13, further comprising determining, at the first device, a requested frequency of the wireless charging signal.

15. The method of claim 13, further comprising:
   engaging in a wireless handshake routine, the wireless handshake routine including wirelessly transmitting a broadcast signal to the second device, and receiving an acknowledgement signal in response to the broadcast signal; and
   determining a distance between the first device and the second device based at least in part on the handshake signal.

16. The method of claim 13, wherein the selecting with which of the one or more inductive charging coils to execute the wireless charging routine is based on a distance between the selected inductive charging coil and a coil of the second device.

17. The method of claim 13, wherein the selecting with which of the one or more inductive charging coils to execute the wireless charging routine is based on a cross-sectional area of the selected inductive charging coil and a cross-sectional area of a coil in the second device.

18. The method of claim 17, wherein selecting with which of the one or more inductive charging coils to execute the wireless charging routine further comprises:
   if the wireless request signal is a request to wirelessly charge the first device, selecting a first inductive charging coil; and
   if the wireless request signal is a request to be wirelessly charged by the first device, selecting a second inductive charging coil having a different cross-sectional area relative to the first inductive charging coil.

19. A system comprising:
   a first device comprising:
     a keyboard comprising one or more keycaps;
     one or more inductive charging coils, each of the one or more inductive charging coils being disposed within a corresponding keycap of the one or more keycaps;
     a charge control circuit electrically coupled to the one or more inductive charging coils, the charge control circuit configured to control (a) an electrical current provided to the one or more inductive charging coils disposed within the one or more keycaps and (b) an electrical current provided from the one or more inductive charging coils disposed within the one or more keycaps to a rechargeable battery of the first device; and
   a second device configured for communicating with the first device, the second device comprising:
     one of a power source, a power source input, and a rechargeable battery;
     one or more inductive charging coils configured for transmitting or receiving a wireless charging signal to or from the first device when the second device is positioned above the keyboard.

20. The system of claim 19, wherein the second device is one of a portable communications device, a portable navigation device, a portable media playing device, and a wireless charging tray.

* * * * *